(12) United States Patent
Balsells et al.

(10) Patent No.: US 8,544,850 B2
(45) Date of Patent: Oct. 1, 2013

(54) SEAL ASSEMBLIES FOR MOVABLE AND STATIC SHAFTS

(75) Inventors: Pete Balsells, Foothill Ranch, CA (US); Mike Foster, Foothill Ranch, CA (US); Majid Ghasiri, Foothill Ranch, CA (US); Sid Niknezhad, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 311 days.

(21) Appl. No.: 12/726,943

(22) Filed: Mar. 18, 2010

(65) Prior Publication Data

US 2010/0237566 A1    Sep. 23, 2010

Related U.S. Application Data

(60) Provisional application No. 61/162,431, filed on Mar. 23, 2009.

(51) Int. Cl.
*F16J 15/32* (2006.01)

(52) U.S. Cl.
USPC ........... 277/551; 277/550; 277/572; 277/511; 277/576; 277/577

(58) Field of Classification Search
USPC ............. 277/550, 511, 551, 522, 549, 576, 277/577
See application file for complete search history.

(56) References Cited

U.S. PATENT DOCUMENTS

| | | | | |
|---|---|---|---|---|
| 2,368,137 A | * | 1/1945 | Harmon | 277/550 |
| 2,651,534 A | * | 9/1953 | Kosatka | 277/551 |
| 2,833,577 A | * | 5/1958 | Reynolds | 277/550 |
| 2,966,376 A | * | 12/1960 | Reynolds | 277/550 |
| 3,782,736 A | * | 1/1974 | Valente | 277/550 |
| 3,871,665 A | * | 3/1975 | Burke et al. | 277/560 |
| 4,039,197 A | * | 8/1977 | Schmidt et al. | 277/580 |
| 4,550,920 A | * | 11/1985 | Matsushima | 277/559 |
| 4,566,701 A | * | 1/1986 | Bomgardner | 277/550 |
| 4,805,943 A | * | 2/1989 | Balsells | 285/318 |
| 4,819,952 A | * | 4/1989 | Edlund | 277/589 |
| 5,058,487 A | * | 10/1991 | Faitel | 92/167 |

(Continued)

FOREIGN PATENT DOCUMENTS

DE    839 651 C    5/1952
EP    1 598 579 A1    11/2005

OTHER PUBLICATIONS

Extended European Search Report dated Jun. 10, 2010 from corresponding European Application No. 10 003 007.1 (11 pages).

*Primary Examiner* — Vishal Patel
*Assistant Examiner* — Eugene G Byrd
(74) *Attorney, Agent, or Firm* — Klein, O'Neill & Singh, LLP (57) ABSTRACT

Seal assemblies for sealing around a moveable shaft, such as rotary or reciprocating, or static, are described. The seal assemblies prevent the passage of lubricant or fluid from a relatively high pressure area on a first side of the seal to a relatively low pressure area on a second side of the seal. In some embodiments, these seals are energized by energizers, such as circular springs or canted springs, to keep the seal in contact with the moveable shaft. The seals have primary and secondary seals. The secondary seal provides initial moderate sealing against abrasive particles or contaminants to reduce the exposure and wear of the primary seal.

19 Claims, 4 Drawing Sheets

(56) References Cited

U.S. PATENT DOCUMENTS

| | | | |
|---|---|---|---|
| 5,137,285 A * | 8/1992 | Pick | 277/503 |
| 5,144,882 A * | 9/1992 | Weissgerber | 92/87 |
| 5,199,718 A * | 4/1993 | Niemiec | 277/552 |
| 5,244,215 A * | 9/1993 | Cather et al. | 277/309 |
| 5,265,890 A * | 11/1993 | Balsells | 277/467 |
| 5,421,591 A * | 6/1995 | Katzensteiner | 277/550 |
| 5,979,904 A * | 11/1999 | Balsells | 277/554 |
| 5,984,316 A * | 11/1999 | Balsells | 277/553 |
| 5,992,856 A * | 11/1999 | Balsells et al. | 277/553 |
| 6,047,970 A * | 4/2000 | Friend et al. | 277/550 |
| 6,050,572 A * | 4/2000 | Balsells et al. | 277/551 |
| 6,052,859 A * | 4/2000 | Diels | 15/256.5 |
| 6,053,502 A * | 4/2000 | Hallenstvedt | 277/572 |
| 6,161,838 A * | 12/2000 | Balsells | 277/511 |
| 6,264,205 B1 * | 7/2001 | Balsells | 277/551 |
| 6,267,383 B1 * | 7/2001 | Morvant | 277/439 |
| 6,293,558 B1 * | 9/2001 | Crapart | 277/552 |
| 6,561,519 B1 * | 5/2003 | Frese et al. | 277/549 |
| 6,641,141 B2 * | 11/2003 | Schroeder | 277/552 |
| 6,840,521 B2 * | 1/2005 | Ikeda | 277/551 |
| 6,945,535 B2 * | 9/2005 | Kapcoe | 277/500 |
| 7,344,140 B2 * | 3/2008 | Ikeda | 277/572 |
| 7,753,376 B2 * | 7/2010 | Kondo et al. | 277/353 |
| 7,832,735 B2 * | 11/2010 | Paykin | 277/568 |
| 7,942,424 B2 * | 5/2011 | Shimomura et al. | 277/551 |
| 8,052,153 B2 * | 11/2011 | Ebihara et al. | 277/572 |
| 8,096,559 B2 * | 1/2012 | Cook | 277/353 |
| 2002/0153664 A1 * | 10/2002 | Schroeder | 277/551 |
| 2006/0006607 A1 * | 1/2006 | Denton et al. | 277/550 |
| 2006/0022414 A1 * | 2/2006 | Balsells | 277/572 |

* cited by examiner

SEAL ASSEMBLIES FOR MOVABLE AND STATIC SHAFTS

CROSS-REFERENCE TO RELATED APPLICATION

This is a regular utility application of provisional application Ser. No. 61/162,431 filed Mar. 23, 2009, the contents of which are expressly incorporated herein by reference.

BACKGROUND

1. Technical Field

The present invention relates to shaft seals for use in rotary, reciprocating, and static applications.

2. Description of Related Art

Shaft seals generally include a seal that extends around a shaft and prevents the passage of lubricant from a relatively high pressure area on a first side of the seal to a relatively low pressure area on a second side of the seal. In some embodiments, these seals are energized by circular springs to provide energized force to the seal to keep the seal in contact with the rotating or reciprocating shaft.

SUMMARY

The various embodiments of the present seal assemblies for rotary, reciprocating, and/or static shafts have several features, no single one of which is solely responsible for their desirable attributes. Embodiments of the present seal assemblies for rotary, reciprocating, and/or static shafts include redundant or dual seals and may include various locking rings. Without limiting the scope of the present embodiments as expressed by the claims that follow, their more prominent features will now be discussed briefly. After considering this discussion, and particularly after reading the section entitled Detailed Description, one will understand how the features of the present embodiments provide advantages, which include increased sturdiness, resistance to rotation, resistance to axial movement, and extrusion resistance, among others. The secondary seal provides initial moderate sealing against abrasive particles or contaminants to reduce the exposure and wear of the primary seal. The present embodiments achieve enhanced performance, reliability, and improved seal life, among others.

One aspect of the present seal assemblies includes the realization that with conventional rotary, liplike, energized seals, the single energized sealing lip or single sealing component may not be enough to provide complete sealing in some applications. In the event that the seal leaks or fails, a secondary seal would be very beneficial to the sealing component to provide backup or redundant sealing ability on a temporary basis. A feature of the present assembly is the structure and arrangement of components to enable incorporation of a secondary seal into a small and often confined space.

One embodiment of the present seal assembly is configured for sealing around a movable or static shaft. The seal assembly comprises a primary seal engaging the shaft at a first location. The seal assembly further comprises a secondary seal engaging the shaft at a second location spaced apart from the first location. The seal assembly further comprises a locking ring for retaining the primary and secondary seals with respect to the shaft. The primary seal is constructed of a first material and the secondary seal is constructed of a second material. The second material has a higher modulus of elasticity than the first material.

Another embodiment of the present seal assembly is configured for sealing around a movable or static shaft. The seal assembly comprises a primary seal engaging the shaft at a first location. The seal assembly further comprises a secondary seal engaging the shaft at a second location spaced apart from the first location. The seal assembly further comprises a locking ring for retaining the primary and secondary seals with respect to the shaft. The locking ring and the secondary seal comprise a unitary component.

Another embodiment of the present seal assembly is configured for sealing around a movable or static shaft. The seal assembly comprises a primary seal engaging the shaft at a first location. The seal assembly further comprises a locking ring for retaining the primary seal with respect to the shaft. A portion of the locking ring comprises a secondary seal engaging the shaft at a second location spaced apart from the first location.

Another embodiment of the present seal assembly is configured for sealing around a movable or static shaft. The seal assembly comprises a primary seal engaging the shaft at a first location. The seal assembly further comprises a secondary seal engaging the shaft at a second location spaced apart from the first location. The seal assembly further comprises a housing containing the primary and secondary seals. The seal assembly further comprises a locking ring for retaining the primary and secondary seals with respect to the housing and the shaft. The locking ring includes a circumferential groove that reduces a contact area between the locking ring and the housing.

Another embodiment of the present seal assembly is configured for sealing around a movable or static shaft. The seal assembly comprises a primary seal engaging the shaft at a first location. A secondary seal engaging the shaft at a second location spaced apart from the first location. Wherein one of the primary seal and the secondary seal is constructed of a first material and the other of the primary seal and the secondary seal is constructed of a second material, and the second material has a higher modulus of elasticity than the first material.

BRIEF DESCRIPTION OF THE DRAWINGS

The various embodiments of the present seal assemblies now will be discussed in detail with an emphasis on highlighting the advantageous features. These embodiments depict the novel and non-obvious seal assemblies shown in the accompanying drawings, which are for illustrative purposes only. These drawings include the following figures, in which like numerals indicate like parts:

FIG. 8A is a detail view of the rotary, reciprocating, and/or static shaft redundant seal with locking means of FIG. 8 showing an alternative configuration of the secondary seal;

FIG. 8B is a detail view of the rotary, reciprocating, and/or static shaft redundant seal with locking means of FIG. 8 showing an alternative configuration of the secondary seal;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

The embodiments illustrated herein describe spring-energized seals. The springs used in the present embodiments may comprise canted-coil springs. Other energizers, including O-rings, "V" springs, finger springs, etc., can be used in place of or in conjunction with the canted coil spring. In certain embodiments, the coil springs may be radially canted, while in certain other embodiments the coil springs may be axially canted. In still further embodiments, the coil springs may be both radially canted and axially canted. Canted-coil springs are described in detail in U.S. Pat. Nos. 4,655,462; 4,826,144; 4,876,781; 4,907,788; 4,915,366; 4,964,204; 5,139,243; 5,160,122; 5,503,375; 5,615,870; 5,709,371; 5,791,638; and 7,055,812. The contents of each of the foregoing patents are hereby expressly incorporated herein by reference.

Figure 1:
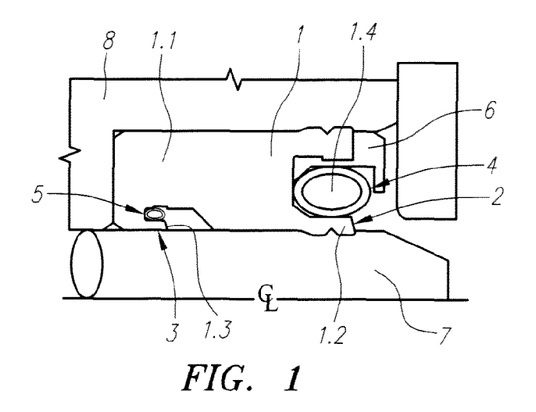
FIG. 1 is a front cross-sectional view of one embodiment of the present rotary, reciprocating, and/or static shaft redundant seal with locking means.

FIG. 1 shows one embodiment of the present rotary, reciprocating, and/or static shaft redundant seal assembly with locking means. Redundant, in this case, indicates that the two seals are incorporated into a single unit, as opposed to two sealing grooves forming part of an assembly whereby various seals are included. Redundant seal 1 comprises primary seal 2 energized by a spring 4 and a secondary seal 3 energized by a spring 5, both providing sealing against shaft 7. The redundant seal 1 comprises a cavity in which spring 4 and locking ring 6 is retained. The locking ring 6 retains and resists rotation or axial movement of the redundant seal 1 and thus the entire sealing assembly in retained in the housing 8 by creating interference between the locking ring 6 and the housing 8.

In one example, a seal body 1.1 is provided comprising two spaced apart seal lips 1.2, 1.3. As shown, the primary seal lip 1.2 is larger than the secondary seal lip 1.3, both in length, thickness, and cavity for receiving a respective energizer. The seal body may be made from an elastomer material or a thermoplastic elastomer (TPE) material of the type selected for the operating conditions. In addition, as shown, the locking ring 6 engages the seal body and forms parts of the cavity 1.4 for retaining the primary loading spring 4.

Figure 2:
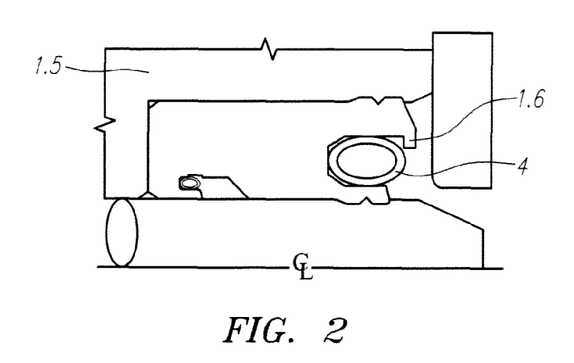
FIG. 2 is a front cross-sectional view of another embodiment of the present rotary, reciprocating, and/or static shaft redundant seal with locking means.

FIG. 2 shows an alternative embodiment of a redundant seal 1.5 similar to FIG. 1, except that the locking ring is omitted. A retaining lip 1.6 is formed with the seal body for retaining the loading spring 4. The seal of FIG. 2 is particularly advantageous for reciprocating shaft applications.

Figure 3:
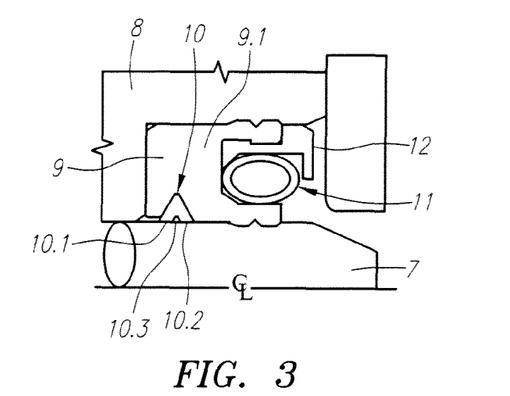
FIG. 3 is a front cross-sectional view of another embodiment of the present rotary, reciprocating, and/or static shaft redundant seal with locking means.

FIG. 3 shows another embodiment in which a triangular or inverted-V scraper 10 is incorporated into the inside diameter of the seal 9, which is energized by a spring 11, to act as a backup scraper to the seal 9. The seal 9 comprises a cavity in which the spring 11 and a locking ring 12 are retained. The locking ring 12 retains and resists rotation or axial movement of the seal assembly in housing 8 by creating interference between locking ring 12 and housing 8. The scraper 10 may be considered as an additional seal, in this instance a secondary seal.

Under conditions of elevated pressure and temperature, the scraper backup ring 10 resists the seal 9 extruding, thus increasing seal life. The reduction in area due to the triangular cross-section of the scraper 10 compared to, for example, a cavity with an energizer is preferred since the compactness of the scraper backup ring allows for greater retention of the triangular shape into the inside diameter of the seal 9. In turn, the arrangement provides a greater degree of retention and limits the extrusion of the seal plastic at elevated temperatures. Thus, a feature of the present device, assembly and method includes a backup scraper 10 having a generally triangular shape, which in one embodiment is a V-shape. In one example, the backup scraper 10 is positioned further away from a high pressure source than the seal 9. In another example, the backup scraper 10 is made from a harder material than the seal body 9.1, such as from an engineered plastic or a metal, and resists seal extruding, such as by providing axial support for the seal along the direction of the shaft 7. In still yet another embodiment, the backup scraper 10 comprises two spaced apart scraper edges 10.1, 10.2, which are separated from one another by a space 10.3, which in one example has a V-shaped contour. A still yet further feature of the present embodiment is a method of making the seal and method of using the seal. Exemplary engineered plastic includes polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), polyimides, and polyphenylene sulfide (PPS).

Figure 4:
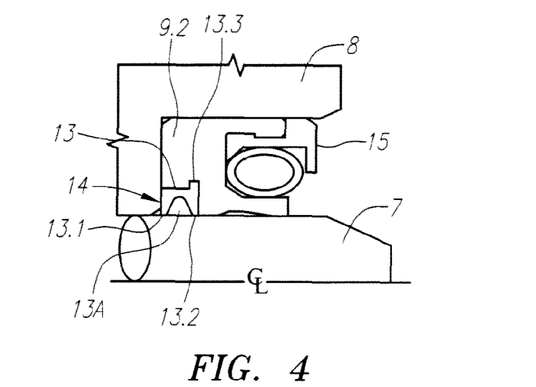
FIG. 4 is a front cross-sectional view of another embodiment of the present rotary, reciprocating, and/or static shaft redundant seal with locking means.

FIG. 4 shows an alternative embodiment similar to FIG. 3 that includes a different type of backup ring 13. The backup ring 13 is similar in design to the one in FIG. 3, but is locked into the internal end portion of the seal 14, which improves retention during use. The backup ring 13 is also located in the internal end portion of the seal 14 to resist extrusion of the seal material and as shown contacts the housing 8. The backup ring 13 includes a circumferential tapered groove 13A to reduce the contact area between the backup ring 13 and the shaft 7 to reduce heat generated by friction. In other words, the scraper surfaces or edges 13.1, 13.2 are made narrower lengthwise compared to if the groove 13A was straight or not as tapered. A locking ring 15 resists the seal moving in a rotating or reciprocating manner. As shown, the backup ring 13 has a projection 13.3 that projects into the seal body 9.2 and contacts the housing 8. In another example, the backup ring 13 contacts the seal body 9.2, the housing 8, and the shaft 7, simultaneously.

Figure 5:
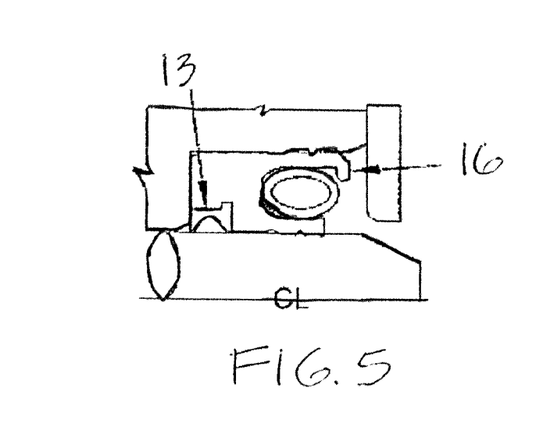
FIG. 5 is a front cross-sectional view of another embodiment of the present rotary, reciprocating, and/or static shaft redundant seal with locking means.

FIG. 5 shows an alternative embodiment similar to FIG. 4 that is particularly advantageous for reciprocating applications. The embodiment of FIG. 5 includes no locking ring, since under conditions of high pressure the seal 16 is usually forced toward the end of the cavity. There is thus less incentive to have a locking ring to resist axial movement.

Figure 6:
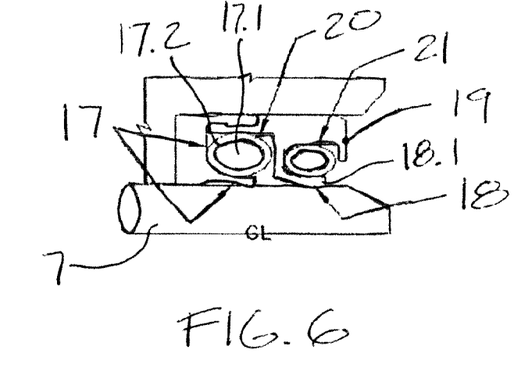
FIG. 6 is a front cross-sectional view of another embodiment of the present rotary, reciprocating, and/or static shaft redundant seal with locking means.

FIG. 6 shows an alternative embodiment that includes two seals. Primary seal 17 is energized by a spring 20 and secondary seal 18 is energized by a spring 21. The two seals are incorporated into one assembly and are held together by an integrated locking ring 19. The locking ring 19 may comprise a material, such as a plastic, that provides locking and sealing in combination with the secondary seal 18. In one embodiment, the primary seal 17 offers superior sealing ability compared to the secondary seal 18. For example, by incorporating certain material properties, such as an elastomer or a TPE, the seal lip is more pliable and seals against the shaft better than the secondary seal 18, which may be made from a high modulus material and therefore has relatively lesser sealing ability. However, by using a high modulus material, the secondary seal provides moderate sealing of abrasive and/or contaminants to thereby reduce the exposure and wear of the primary seal 17. The locking ring 19 retains the two seals in one assembly unit. In an alternative embodiment, the locking ring 19 may be omitted, leaving a primary seal and a secondary seal, with one or the other of the seals being made from a high modulus material. Thus, a feature of the present embodiment is a combination locking ring 19 that engages with a primary seal 17 and that has a sealing lip 18.1 and a cavity having an energizer 21 disposed therein for energizing the sealing lip 18.1 towards the shaft 7. A further feature of the present seal assembly is a secondary seal 18 that is positioned closer to a high pressure source than the primary seal 17 to reduce abrasive and/or contaminants from reaching the primary seal. A still further feature of the present seal assembly is a locking ring 19 that engages a primary seal 17, that has a sealing lip 18.1 to provide secondary sealing, and that forms part of a cavity 17.1 for retaining a primary energizer 17.2. A still yet further feature of the present embodiment is a method of making the alternative seal and method of using the alternative seal.

Figure 7:
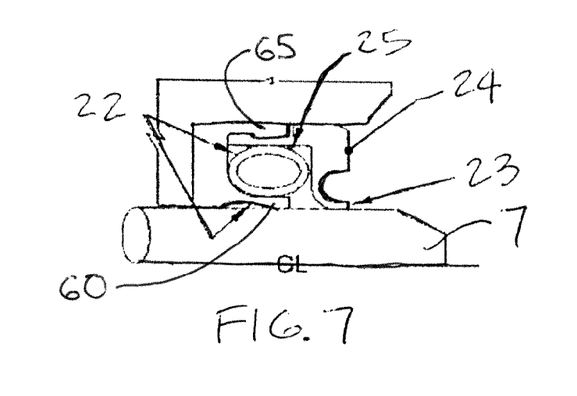
FIG. 7 is a front cross-sectional view of another embodiment of the present rotary, reciprocating, and/or static shaft redundant seal with locking means.
Figure 7A:
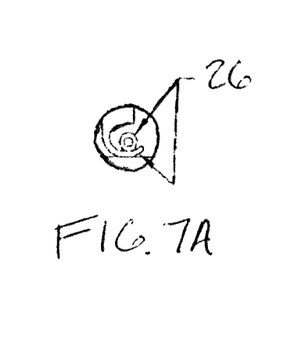
FIG. 7A is a detail view of the rotary, reciprocating, and/or static shaft redundant seal with locking means of FIG. 7 showing an alternative configuration of the secondary seal.
Figure 7B:
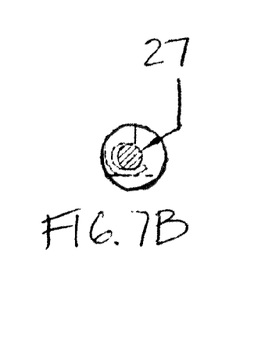
FIG. 7B is a detail view of the rotary, reciprocating, and/or static shaft redundant seal with locking means of FIG. 7 showing an alternative configuration of the secondary seal.

FIG. 7 shows an alternative embodiment similar to FIG. 6 except that the secondary seal 24 has been replaced with a memory liplike seal 23 instead of a spring energized seal. In other words, the liplike seal has elastic properties that allow it to bias against the shaft 7 without an energizer. As shown, the primary seal has inner and outer extending seal sections that may be referred to as an inner flange 60 and an outer flange 65, respectively. FIG. 7A shows another alternative embodiment in which a garter spring 26 is incorporated into the secondary seal 23 to provide radial force to increase sealing ability at the lip. FIG. 7B shows another alternative embodiment in which a toroidal O-ring 27 provides the radial sealing force.

Figure 8:
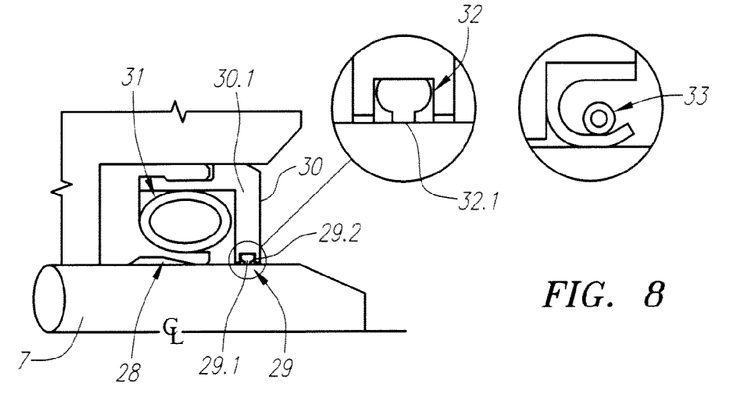
FIG. 8 is a front cross-sectional view of another embodiment of the present rotary, reciprocating, and/or static shaft redundant seal with locking means.

FIG. 8 shows an alternative embodiment of the present rotary, reciprocating, and/or static shaft seal assembly having a primary seal 28 energized by a spring 31 and a secondary seal 29. The secondary seal 29 is part of the locking ring 30 and includes a toroidal O-ring or rectangular cross-section O-ring 29.1 located within a groove 29.2 to provide secondary sealing against the shaft 7. The sealing ring is detachable from the groove 29.2. As shown, the locking ring 30 comprises a flange 30.1 having the groove 29.2 formed at a radial end thereof. The locking ring 30, and in particular the flange 30.1, contacts the spring 31 and forms part of the cavity for retaining the spring 31. The locking ring 30 provides a support that allows for the mounting of the secondary seal, thus providing sealing ability between the shaft 7 and the locking ring 30. FIG. 8A shows an alternate embodiment including a circumferential seal 32 having a small contact area 32.1 with the shaft. FIG. 8B shows an alternate embodiment of the secondary seal in which an extension garter spring 33 provides additional energizing force to affect sealing. A still yet further feature of the present embodiment is a method of making the seal assembly and method of using the seal assembly.

Figure 9:
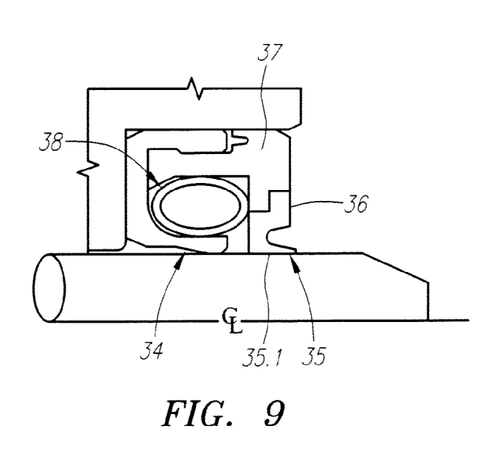
FIG. 9 is a front cross-sectional view of another embodiment of the present rotary, reciprocating, and/or static shaft redundant seal with locking means.
Figure 9A:
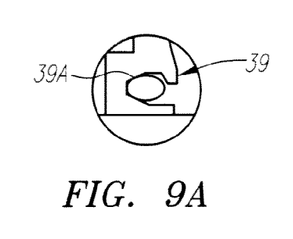
FIG. 9A is a detail view of the rotary, reciprocating, and/or static shaft redundant seal with locking means of FIG. 9 showing an alternative configuration of the secondary seal.

FIG. 9 shows an alternative embodiment comprising a dual in-line sealing system with locking ring 37 and primary seal 34 having an energizer 38, such as a canted coil spring. The secondary seal 35 may be molded integrally with the locking ring 37 or separately molded and bonded or engaged to the locking ring. The seal lip 35.1 of the secondary seal may be made from a high modulus material to reduce abrasive and/or contaminants from reaching the primary seal or may be made from a softer material, such as an elastomer or a TPE, that engages the locking ring. FIG. 9A shows an alternative embodiment of the secondary seal 37 in which the secondary seal 39 is energized with a canted-coil spring 39A.

Figure 10:
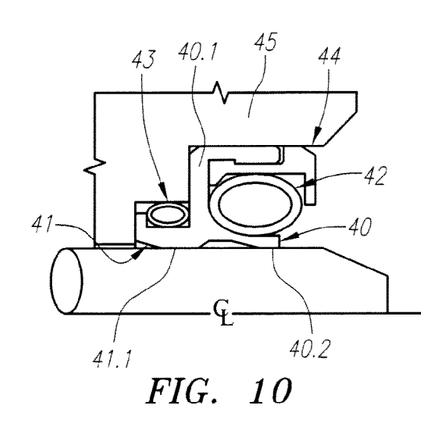
FIG. 10 is a front cross-sectional view of another embodiment of the present rotary, reciprocating, and/or static shaft redundant seal with locking means.
Figure 10A:
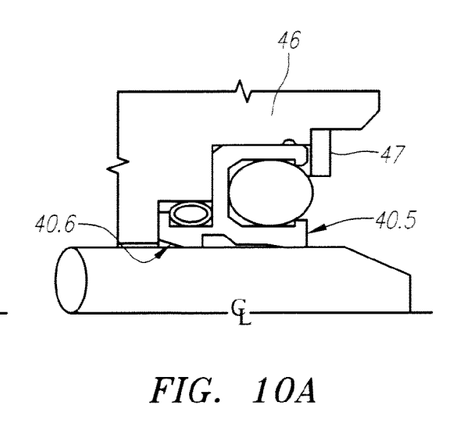
FIG. 10A is a front cross-sectional view of another embodiment of the present rotary, reciprocating, and/or static shaft redundant seal with locking means.

FIG. 10 shows an alternative embodiment comprising a redundant rotary, reciprocating, and/or static shaft seal assembly with a locking ring 44. The secondary seal 41 is located rearward from the primary seal 40 and functions primarily as a dust seal. The secondary seal 41 is energized with a canted-coil spring 43. The locking ring 44 retains the seal in the housing 45. The seal body 40.1 thus comprises both the primary sealing lip 10.2 and secondary sealing lip 41.1. Thus, a feature of the present seal assembly is a double seal comprising a singularly formed seal body that is energized by two energizers. A still further feature is a singularly formed seal body that has two sealing lips and two energizers and wherein the energizers energize the two sealing lips. FIG. 10A shows an alternative embodiment similar to FIG. 10 in which no locking ring is provided to retain the seal in position. Instead, a support ring 47 retained the seal in the housing 46. Also shown are primary sealing lip 40.5 and secondary sealing lip 40.6.

Figure 11:
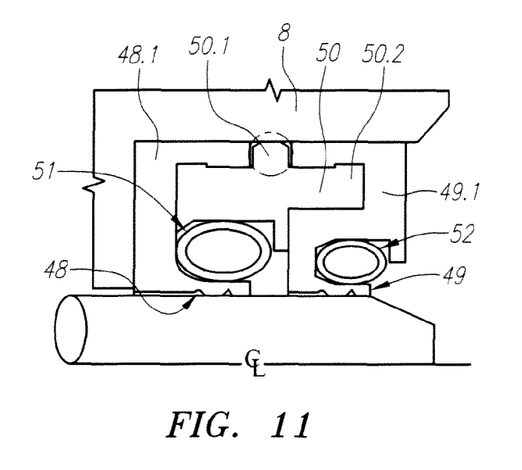
FIG. 11 is a front cross-sectional view of another embodiment of the present rotary, reciprocating, and/or static shaft redundant seal with locking means.
Figure 11A:
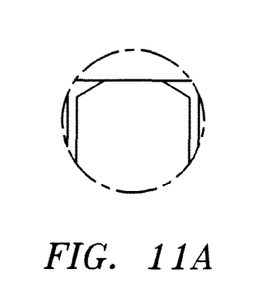
FIG. 11A is a detail view of the circled portion of the rotary, reciprocating, and/or static shaft redundant seal with locking means of FIG. 11.

FIG. 11 shows an alternative embodiment in which a single locking ring 50 retains two separate seals, primary seal 48 and secondary seal 49, thus providing a rotary, reciprocating, and/or static shaft dual seal spring energized by springs 51 and 52. The single locking ring 50 may be retained in the housing 8 by pressing the locking ring into the housing with an interference between the outside diameter of the locking ring and the inside diameter of the housing 8. FIG. 11A shows a detail view of the circled section of FIG. 11, outlining the manner in which the locking or engagement is achieved between the interference of the locking ring outside diameter and the housing inside diameter. As shown, the locking ring 50 has a plus "+" shape cross-section comprising a vertical arm 50.1 and a crossing horizontal arm 50.2. In one example, both the primary seal body 48.1 and the secondary seal body 49.1 are made from a pliable material, such as an appropriate elastomer or TPE material. In another example, the secondary seal body 49.1 is made from a more rigid material than the primary seal body 48.1, such as a high modulus material, for example engineered plastic or metal.

Figure 11B:
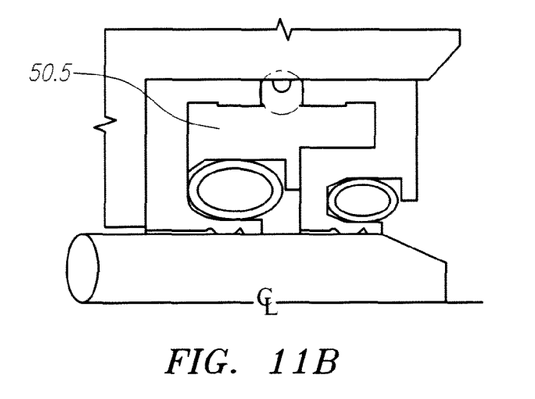
FIG. 11B is a front cross-sectional view of another embodiment of the present rotary, reciprocating, and/or static shaft redundant seal with locking means.
Figure 11C:
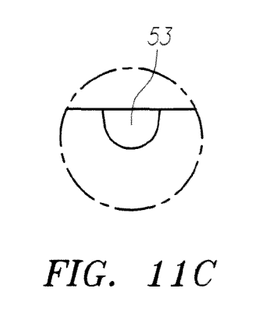
FIG. 11C is a detail view of the circled portion of the rotary, reciprocating, and/or static shaft redundant seal with locking means of FIG. 11B.

FIG. 11B shows an alternative embodiment similar to FIG. 11 in which a variation of the locking ring 50.5 includes a circumferential groove 53 that reduces the area of contact at the interference between the outside diameter of the locking ring and the housing diameter. FIG. 11C shows a detail view of the circled section of FIG. 11B, outlining the circumferential groove 53 and the manner in which the engagement is achieved between the interference of the locking ring outside diameter and the housing inside diameter.

Figure 11D:
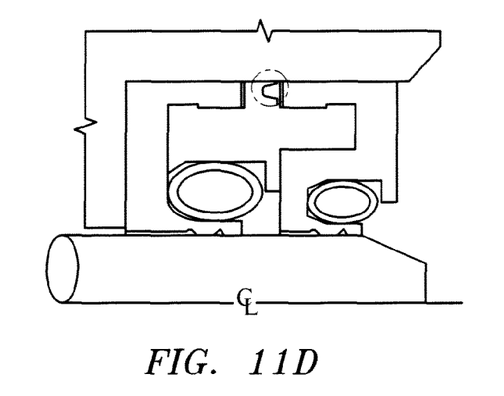
FIG. 11D is a front cross-sectional view of another embodiment of the present rotary, reciprocating, and/or static shaft redundant seal with locking means.
Figure 11E:
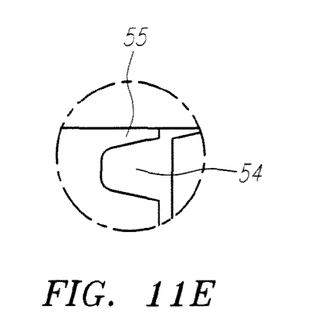
FIG. 11E is a detail view of the circled portion of the rotary, reciprocating, and/or static shaft redundant seal with locking means of FIG. 11D.

FIG. 11D shows yet another alternative embodiment similar to FIGS. 11 and 11B in which an axial groove 54 includes a cantilever spring 55 that allows for variation in tolerances due to the deflection of the cantilever spring 55, thus affording greater variation in tolerances and facilitating ease of manufacturing. FIG. 11E shows a detail view of the circled section of FIG. 11D, outlining the manner in which the interference occurs between the outside diameter of the locking ring and the inside diameter of the housing.

The present seal assemblies for rotary, reciprocating, and/or static shafts and static applications offers a series of double-sealing seal assemblies with multiple design features such as increased sturdiness, resistance to rotation, resistance to axial movement, and extrusion resistance. The present seal assemblies also offer increased seal life through using a secondary seal to provide initial moderate sealing against abrasive particles or contaminants to reduce the exposure and wear of the primary seal. The present assemblies also provide a back up seal that can provide moderate sealing if the primary seal happens to fail or leak, all resulting in enhanced performance and reliability.

The above description presents the best mode contemplated for carrying out the present seal assemblies, and of the manner of making and using them, in such full, clear, concise, and exact terms as to enable any person skilled in the art to which it pertains to make and use these seal assemblies. These seal assemblies are, however, susceptible to modifications and alternate constructions from that discussed above that are fully equivalent. Consequently, these seal assemblies are not limited to the particular embodiments disclosed. On the contrary, these seal assemblies cover all modifications and alternate constructions coming within the spirit and scope of the seal assemblies as generally expressed by the following claims, which particularly point out and distinctly claim the subject matter of the seal assemblies.

What is claimed is:

1. A seal assembly for sealing around a moveable or static shaft, comprising:
    a primary seal for sealing the shaft at a first location of the shaft comprising a lip seal;
    a secondary seal sealing the shaft at a second location of the shaft spaced apart from the first location of the shaft, said secondary seal comprising a lip seal and a second cavity;
    a single locking ring for retaining the primary seal and the secondary seal with respect to the shaft, said single locking ring and said primary seal defining a first cavity and said single locking ring and said secondary seal forming a single component;
    a first energizer located in the first cavity for energizing the lip seal of the primary seal against the shaft and a second energizer located in the second cavity for energizing the lip seal of the secondary seal against the shaft;
    wherein the primary seal is constructed from a first material and the secondary seal is constructed from a second material, and the second material has a higher modulus of elasticity than the first material; and
    wherein the single locking ring is made from the second material.

2. The seal assembly of claim 1, wherein the first material is at least one of an elastomer material and a thermoplastic elastomer (TPE) material.

3. The seal assembly of claim 1, wherein the second material is at least one of a metal and an engineered plastic.

4. The seal assembly of claim 1, wherein the second energizer is smaller in cross-sectional dimension than the first energizer.

5. The seal assembly of claim 1, wherein said locking ring and said secondary seal are molded as a single component.

6. The seal assembly of claim 1, wherein said locking ring projects from the secondary seal and into the primary seal.

7. The seal assembly of claim 1, wherein the first energizer is biased against the locking ring.

8. A seal assembly for sealing around a moveable or static shaft, comprising:
    a primary seal made from a first material engaging the shaft at a first location of the shaft and comprising an outer flange and a lip seal defining a cavity having a canted coil spring disposed therein biasing the lip seal against the shaft and biasing the outer flange;
    a secondary seal made from a second material, which differs from the first material, engaging the shaft at a second location of the shaft spaced apart from the first location and having a cavity and an energizer disposed therein; and
    a single locking ring for retaining the primary and secondary seals with respect to the shaft;
    wherein the single locking ring and the secondary seal are formed as a single component and from the second material.

9. The seal assembly of claim 8, wherein the canted coil spring is larger in cross-sectional dimension than the energizer.

10. The seal assembly of claim 9, wherein the energizer is a canted coil spring.

11. The seal assembly of claim 8, wherein the secondary seal comprises a lip seal that points in an opposite direction of the lip seal of the primary seal.

12. The seal assembly of claim 8, wherein the secondary seal comprises a groove having a detachable sealing ring.

13. A method for sealing a shaft comprising:
    placing a seal assembly around the shaft and against a housing; the seal assembly comprising a primary seal comprising a lip seal made from a first material and a secondary seal comprising a lip seal made from a second material;
    wedging only one locking ring against the housing and the seal assembly to prevent rotation of the primary seal and the secondary seal relative to the housing, the only one locking ring and the primary seal defining a cavity;
    providing an energizer in the cavity to energize the lip seal of the primary seal against the shaft and the only one locking ring against the housing; and wherein the only one locking ring and the secondary seal are made from a single component and the second material.

14. The method for sealing of claim 13, further comprising a second energizer of a smaller cross-sectional dimension than the energizer.

15. The method for sealing of claim 13, further comprising placing a second energizer in mechanical communication with the secondary seal and biasing the lip seal of the secondary seal against the shaft.

16. The method for sealing of claim 14, wherein the second energizer is an O-ring.

17. The method for sealing of claim 13, wherein the lip seal of the secondary seal and the lip seal of the primary seal face a same direction.

18. The method for sealing of claim 13, wherein the second material has a higher modulus of elasticity than the first material.

19. The method for sealing of claim 13, wherein the seal lip of the secondary seal is bonded to a body of the secondary seal.

\* \* \* \* \*